(12) United States Patent
Czapla et al.

(10) Patent No.: US 12,060,851 B2
(45) Date of Patent: Aug. 13, 2024

(54) BYPASS TURBOFAN INCLUDING A SYSTEM FOR BLOCKING THE SECONDARY FLOW INCLUDING VEILS

(71) Applicant: Airbus Operations SAS, Toulouse (FR)

(72) Inventors: Lionel Czapla, Toulouse (FR);
Benjamin Thubert, Toulouse (FR)

(73) Assignee: Airbus Operations SAS, Toulouse (FR)

(*) Notice: Subject to any disclaimer, the term of this patent is extended or adjusted under 35 U.S.C. 154(b) by 0 days.

(21) Appl. No.: 18/475,570

(22) Filed: Sep. 27, 2023

(65) Prior Publication Data
US 2024/0110536 A1  Apr. 4, 2024

(30) Foreign Application Priority Data
Sep. 30, 2022 (FR) .................................. 2209982

(51) Int. Cl.
| | |
|---|---|
| *F02K 1/72* | (2006.01) |
| *B64D 29/02* | (2006.01) |
| *B64D 29/06* | (2006.01) |
| *F02K 3/04* | (2006.01) |
| *F02K 3/06* | (2006.01) |

(52) U.S. Cl.
CPC .............. *F02K 3/04* (2013.01); *B64D 29/02* (2013.01); *B64D 29/06* (2013.01); *F02K 1/72* (2013.01); *F02K 3/06* (2013.01); *F05D 2220/36* (2013.01)

(58) Field of Classification Search
CPC ...... F02K 3/04; F02K 3/06; F02K 1/70; F02K 1/72; F02K 1/74; F02K 1/763; B64D 29/02; B64D 29/06; F05D 2220/36
See application file for complete search history.

(56) References Cited

U.S. PATENT DOCUMENTS

| | | | |
|---|---|---|---|
| 10,655,563 | B2 | 5/2020 | Surply et al. |
| 2018/0274484 | A1* | 9/2018 | Ridray ................ F02K 1/763 |
| 2021/0017935 | A1 | 1/2021 | Cazeaux et al. |
| 2021/0207556 | A1* | 7/2021 | Czapla ................ F02K 1/763 |
| 2021/0207557 | A1 | 7/2021 | Czapla et al. |
| 2022/0228541 | A1* | 7/2022 | Porte .................... F02K 1/62 |

OTHER PUBLICATIONS

French Search Report for corresponding French Patent Application No. 2209982 dated May 10, 2023; priority document.

* cited by examiner

*Primary Examiner* — Steven M Sutherland
(74) *Attorney, Agent, or Firm* — Greer, Burns & Crain, Ltd.

(57) ABSTRACT

A bypass turbofan with a nacelle delimiting a stream and including a cowl mobile in translation between an advanced position in which a window is open between the stream and the exterior, transmission systems, each of which includes at least one arm mobile in rotation between retracted and deployed positions across the stream, in which each transmission system is mobile in translation between advanced and retracted positions, for each arm, a flexible veil fastened to the arm and alternately occupying a folded or unfolded position, and, for each transmission system, an actuator configured to move the mobile cowl, the transmission system and each arm.

6 Claims, 5 Drawing Sheets

BYPASS TURBOFAN INCLUDING A SYSTEM FOR BLOCKING THE SECONDARY FLOW INCLUDING VEILS

CROSS-REFERENCES TO RELATED APPLICATIONS

This application claims the benefit of the French patent application No. 2209982 filed on Sep. 30, 2022, the entire disclosures of which are incorporated herein by way of reference.

FIELD OF THE INVENTION

The present invention concerns a bypass turbofan that includes flexible veils and, for each veil, an arm mobile in rotation to move the veil across the secondary flow stream and an aircraft including at least one such bypass turbofan.

BACKGROUND OF THE INVENTION

An aircraft includes a fuselage to each side of which is fixed a wing. Under each wing is suspended at least one bypass turbofan. Each bypass turbofan is fixed under the wing by means of a pylon that is fixed between the structure of the wing and the structure of the bypass turbofan.

The bypass turbofan includes an engine and a nacelle that is fixed around the engine. The bypass turbofan has between the nacelle and the engine a secondary stream in which circulates a secondary airflow.

The nacelle includes a plurality of blocker doors, each mobile in rotation on the structure of the nacelle between a retracted position in which it is outside the secondary stream and a deployed position in which it is positioned across the secondary stream in order to divert the secondary airflow toward a window in the wall of the nacelle that is open between the secondary stream and the exterior of the nacelle.

Thus, the secondary flow is diverted toward the exterior and more precisely toward the front of the turbojet in order to produce a reverse thrust.

Although the blocker doors are entirely satisfactory, it is desirable to find different mechanisms, in particular, less heavy mechanisms.

SUMMARY OF THE INVENTION

An object of the present invention is to propose a bypass turbofan that includes flexible veils and, for each veil, an arm mobile in rotation to move the veil across the stream of the secondary flow.

To this end there is proposed a bypass turbofan having a longitudinal direction and including an engine and a nacelle surrounding the engine that includes a fan cowl, in which a stream of a secondary flow is delimited between the nacelle and the engine and in which a flow of air circulates in a flow direction, the nacelle including:
- a fixed structure fixed to the fan cowl and including a cascade support carrying cascades,
- a mobile cowl that is mobile in translation on the fixed structure in a translation direction between an advanced position in which the mobile cowl is positioned so that it is close to the fan cowl and a retracted position in which the mobile cowl is positioned so that it is far from the fan cowl to define between them an open window between the stream and the exterior of the nacelle and facing the cascades,
- a plurality of transmission systems, each of which includes at least one arm with a distal end and a proximal end mobile in translation on the transmission system about a rotation axis globally parallel to the longitudinal direction, in which the arm is mobile between a retracted position in which it is outside the stream and a deployed position in which it is across the stream, in which each transmission system is mobile in translation between an advanced position corresponding to the advanced position of the mobile cowl and a retracted position corresponding to the retracted position of the mobile cowl,
- for each arm, a flexible veil having a first edge fastened to the arm, a second edge, one end of which is fixed to an adjoining transmission system, and a third edge, in which the veil is mobile alternately between a folded position corresponding to the retracted position of the arm in which the third edge is far from the engine and an unfolded position corresponding to the deployed position of the arm in which the third edge is close to the engine, and
- for each transmission system, an actuator adapted to move the mobile cowl and the transmission system simultaneously between their advanced position and their retracted position and vice versa and in which the transmission system is adapted to move each arm from its retracted position to its deployed position during movement of the transmission system from its advanced position to its retracted position and vice versa,
- wherein the actuator includes:
  - a fixed tube fixed to the fixed structure and that has a longitudinal axis parallel to the longitudinal direction,
  - a shaft mobile in rotation inside the fixed tube about the longitudinal axis and driven in rotation by a motor,
  - a mobile tube mounted inside the fixed tube and a proximal end of which is mounted outside the shaft, the mobile tube having a helical connection with the fixed tube with a first screw pitch about the longitudinal axis and the mobile tube having with the shaft a sliding connection along the longitudinal axis, in which the transmission system is fastened to the mobile tube and in which at the level of a distal end the mobile tube has an internally threaded bore coaxial with the longitudinal axis, and
  - a threaded rod a proximal end of which is screwed into the internally threaded bore with a second screw pitch and a distal end of which has a pressed-in connection to the mobile cowl.

Replacing the blocker doors and their driving mechanism by the flexible veil and the set of arms mobile in rotation enables a reduction of weight.

A transmission system advantageously carries a pair of arms.

The second screw pitch is advantageously greater than the first screw pitch.

In accordance with one particular embodiment, the transmission system includes:
- a main gear fixed coaxially onto the mobile tube,
- on respective opposite sides of the main gear a spacer that is internally threaded and screwed onto the external thread of the mobile tube and bears against a face of the main gear,
- for each spacer, a first ball bearing into which the spacer is pressed, a base including on respective opposite sides of the main gear a flange, in which the two flanges are fastened to one another, in which each flange has a hole through it into which a first ball bearing is pressed, in which the base includes immobilizing means for immobilizing it in rotation relative to the longitudinal axis, and for each arm, a secondary gear fastened to the arm and mobile in rotation on the base about an axis parallel to the longitudinal axis and driven by the main gear.

In accordance with one particular embodiment, the transmission system includes:

a main gear fixed coaxially onto the mobile tube, on respective opposite sides of the main gear, a smooth spacer mounted to slide on the external thread of the mobile tube and bearing against a face of the main gear, for each spacer, a first ball bearing into which the spacer is pressed, a base including on respective opposite sides of the main gear a flange, in which the two flanges are fastened to one another, in which each flange has a hole through it into which a first ball bearing is pressed, in which the base includes immobilizing means that immobilize it in rotation relative to the longitudinal axis, and for each arm, a secondary gear fastened to the arm and mobile in rotation on the base about an axis parallel to the longitudinal axis and driven by the main gear.

The invention also proposes an aircraft including at least one bypass turbofan conforming to any one of the previous variants.

BRIEF DESCRIPTION OF THE DRAWINGS

The features of the invention mentioned hereinabove and others will become more clearly apparent on reading the following description of one embodiment, the description being given with reference to the appended drawings, in which.

DETAILED DESCRIPTION OF THE PREFERRED EMBODIMENTS

Figure 1:
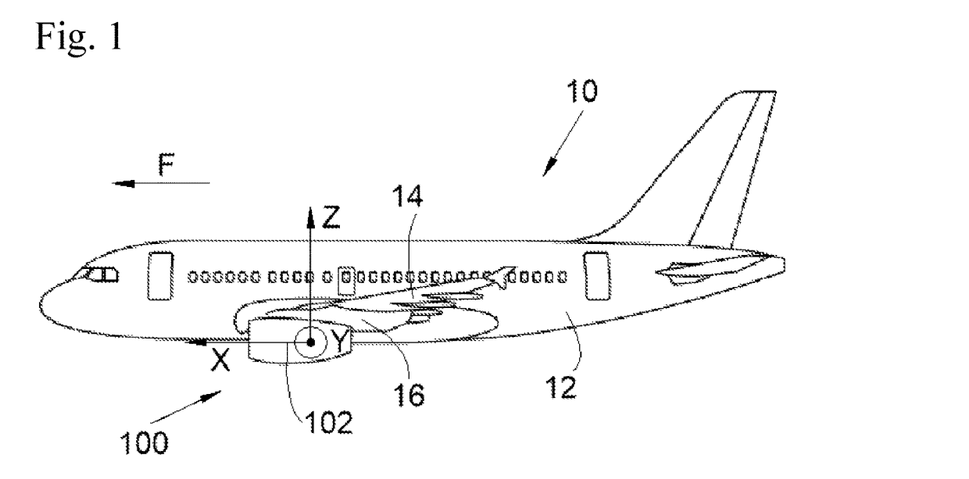
FIG. 1 is a side view of an aircraft including a bypass turbofan according to the invention.

In the following description terms relating to a position are given with reference to the direction of forward movement of an aircraft as represented in FIG. 1 by the arrow F.

FIG. 1 shows an aircraft 10 that includes a fuselage 12, on each side of which is fixed a wing 14 that carries at least one bypass turbofan 100 according to the invention. The bypass turbofan 100 is fixed under the wing 14 by means of a pylon 16.

Figure 2:
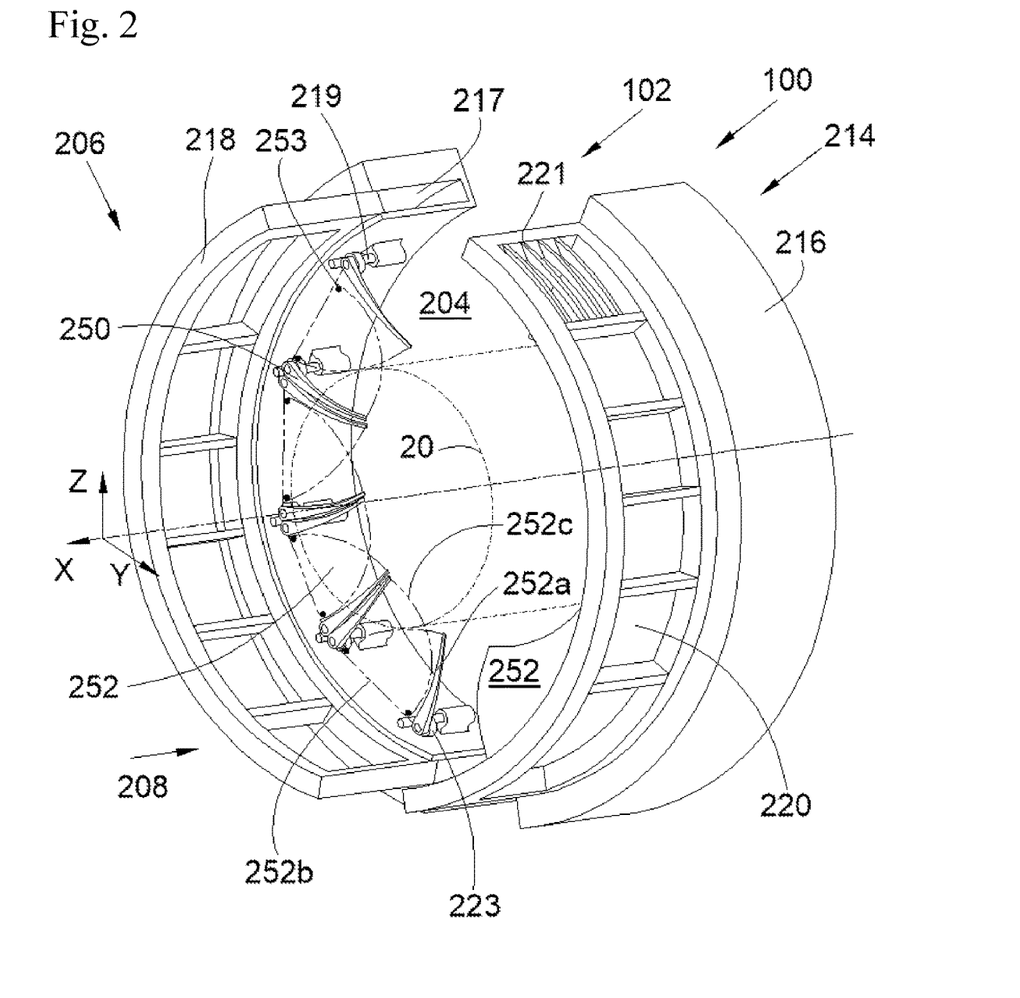
FIG. 2 is a perspective view of the bypass turbofan according to the invention in retracted and deployed positions.
Figure 3:
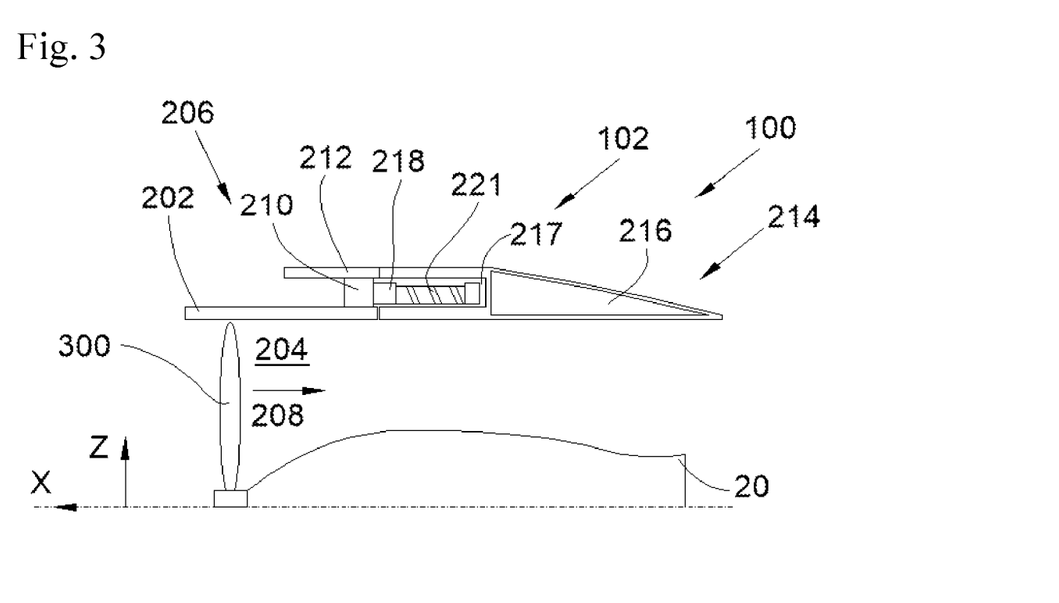
FIG. 3 is a schematic representation of a bypass turbofan according to the invention seen in section on a vertical plane.

FIG. 2 and FIG. 3 show the bypass turbofan 100 that has a nacelle 102 and an engine 20 that is accommodated inside the nacelle 102. The bypass turbofan 100 also includes a fan cowl 202. In FIG. 2 the engine 20 is represented by a chain-dotted line cylinder.

In the following description and by convention, X denotes the longitudinal direction of the bypass turbofan 100 that is parallel to the longitudinal axis of the aircraft 10 oriented positively toward the front of the aircraft 10, Y denotes the transverse direction that is horizontal when the aircraft is on the ground and Z denotes the vertical direction, the three directions X, Y and Z being mutually orthogonal.

FIG. 2 shows the bypass turbofan 100 and FIG. 3 shows a schematic representation in section of the bypass turbofan 100.

The bypass turbofan 100 has between the nacelle 102 and the engine 20 a stream 204 in which circulates a secondary flow 208 coming from the air intake via a fan 300 and which therefore flows in the flow direction from front to rear.

The nacelle 102 has a fixed structure 206 which is fixedly mounted on the fan cowl 202. The fixed structure 206 here comprises, in particular, a front frame 210 mounted around the fan cowl 202 and exterior panels 212 fixed to the front frame 210 and forming an exterior aerodynamic surface.

The nacelle 102 includes a mobile assembly 214 that includes a mobile cowl 216 that forms the exterior walls of the nozzle.

The fixed structure 206 also includes a cascade support 218 that takes the form of a cylinder with perforated walls between which are disposed cascades 221. Here the cascade support 218 is fixed to the front frame 210.

In the embodiment of the invention shown in FIGS. 2 and 3, the mobile cowl 216 includes a housing 217 that is cylindrical and in which the cascade support 218 is placed.

The mobile cowl 216 is mobile in translation in a translation direction globally parallel to the longitudinal direction X on the fixed structure 206 of the nacelle 102.

The mobile cowl 216 is mobile between an advanced position (FIG. 3) and a retracted position (FIG. 2) and vice versa. In the advanced position the mobile cowl 216 is positioned as far forward as possible relative to the direction of flow so that the mobile cowl 216 is close to the exterior panels 212 and the fan cowl 202 and thus forms a continuous aerodynamic surface. In the retracted position, the mobile cowl 216 is positioned as far aft as possible relative to the direction of flow so that the mobile cowl 216 is far from the exterior panels 212 and the fan cowl 202 so as to define between them a window 220 that faces the cascades 221 and is open between the stream 204 and the exterior.

In the advanced position, the mobile cowl 216 and the exterior panels 212 are extended so as to define the exterior surface of the nacelle 102 and the mobile cowl 216 and the fan cowl 202 are extended so as to define the exterior surface of the stream 204. In the advanced position, the mobile cowl 216 is positioned facing the cascades 221 and prevents the passage of the flow of air.

In the retracted position, the mobile cowl 216, the fan cowl 202 and the exterior panels 212 are spaced and define between them the open window 220 between the stream 204 and the exterior of the nacelle 102. That is to say, the air of the secondary flow 208 passes through the window 220 to the exterior of the bypass turbofan 100 via the cascades 221.

In FIG. 2 the mobile cowl 216 and the cascade support 218 are made in two parts symmetrical with respect to a vertical plane XZ. These two parts are mounted on beams of the fixed structure 206, here, in particular, a 12 o'clock beam and a 6 o'clock beam that fill the gaps between the two parts constituting the mobile cowl 216 and the cascade support 218. Of course, the number of parts constituting the mobile cowl 216 and the cascade support 218 may be different.

The mobile cowl 216 may be guided in movement in translation by any appropriate means, such as, for example, systems of slides between the beams of the fixed structure 206 and the mobile cowl 216.

The cascade support 218 is fixed to the front frame 210 and more generally to the fixed structure 206, in the advanced position the cascade support 218 is located inside the mobile cowl 218, here inside the housing 217, and in the retracted position the cascade support 218 is located between the mobile cowl 216, the fan cowl 202 and the exterior panels 212 so as to be at the level of the window 220.

The nacelle 102 also includes a plurality of transmission systems 223, each of which includes at least one arm 250 with a distal end and a proximal end that is mobile in rotation on the transmission system 223 about a rotation axis globally parallel to the longitudinal direction X.

Each arm 250 is therefore mobile between a retracted position in which it is outside the stream 204 and is pressed against the exterior edges of the stream 204 and a deployed position (FIG. 2) in which it is across the stream 204. Overall, each arm 250 extends in a plane perpendicular to the longitudinal direction X.

Moreover, each transmission system 223 is mobile in translation between an advanced position corresponding to the advanced position of the mobile cowl 216 and a retracted position corresponding to the retracted position of the mobile cowl 216.

For each arm 250, the nacelle 102 includes a flexible veil 252 including a first edge 252a fastened to the arm 250, a second edge 252b one end of which is fixed to an adjoining transmission system 223, and a third edge 252c which here is arcuate. There is, therefore, a plurality of flexible veils 252 seen as if by transparency (chain-dotted lines) on the left in FIG. 2 that is distributed circumferentially around the engine 20 at the exterior edge of the stream 204, that is to say, along the mobile cowl 216. The number of arms 250 and the number of veils 252 depend on the dimensions of the bypass turbofan 100 and the dimensions of the veils 252.

In the retracted position, each veil 252 is aft of the window 220.

To be more precise, in the embodiment of the invention described here, each edge 252a-c extends between a first end and a second end. The second end of the first edge 252a joins the second end of the second edge 252b.

The second edge 252b is positioned along the exterior edge of the stream 204 and fixed, here by a fixed point 253 at the level of its first end that is fixed to the adjoining transmission system 223.

In the embodiment of the invention described here, the first edge 252a and the second edge 252b extend globally along radii around the rotation axis of the arm 250.

The first end of the third edge 252c joins the first end of the first edge 252a and the second end of the third edge 252c joins the first end of the second edge 252b. In the embodiment of the invention described here, the third edge 252c is arcuate.

Figure 4:
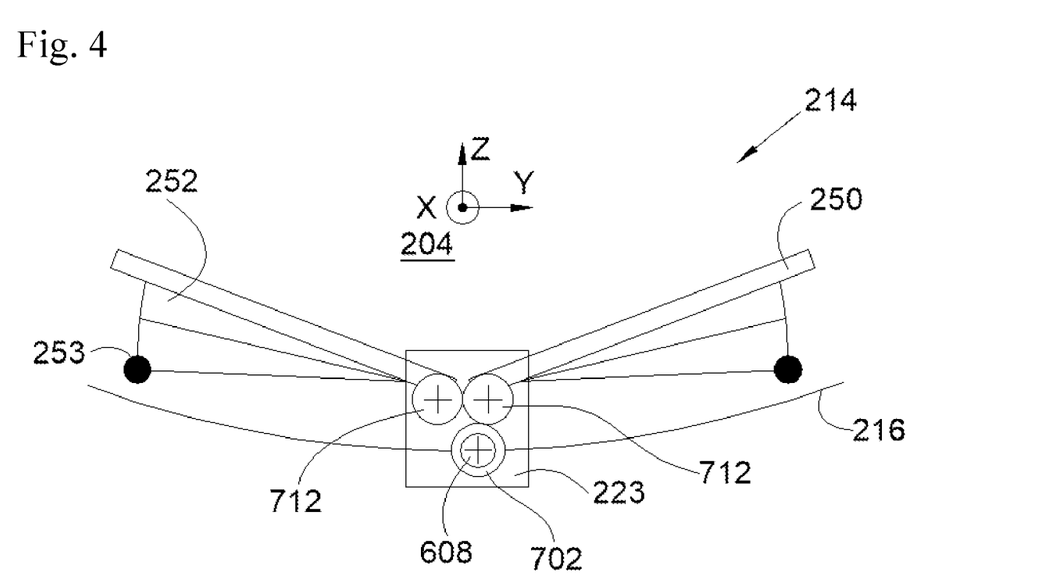
FIG. 4 is a front view of a pair of veils in a folded position.

Here, each veil 252 has the overall shape of a quarter-circle and is mobile alternately between a folded position (FIG. 4) corresponding to the retracted position of the arm 250, in which the third edge 252c is far from the engine 20 and close to the exterior edge of the stream 204 to leave the stream 204 free, and a deployed position (FIG. 5) corresponding to the deployed position of the arm 250, in which the third edge 252c is close to the engine 20 to block the stream 204 and to direct the secondary flow 208 toward the window 220 and then to the outside via the cascades 221. Thus, in the folded position, the veil 252 is not across the stream 204 and in the unfolded position it is across the stream 204.

For each transmission system 223, the nacelle 102 includes an actuator 219 that is arranged to move the mobile cowl 216 and the transmission system 223 simultaneously between their advanced and retracted positions and vice versa. The transmission system 223 is also adapted to move each arm 250 that it carries from the retracted position to the deployed position during the movement of the transmission system 223 from its advanced position to its retracted position and vice versa and therefore, at the same time, the veil 252 attached to the arm 250 goes from its folded position to its unfolded position and vice versa.

Each actuator 219 is controlled by a control unit, for example of the processor type, that controls movement one way or the other depending on the requirements of the aircraft 10.

Figure 6:
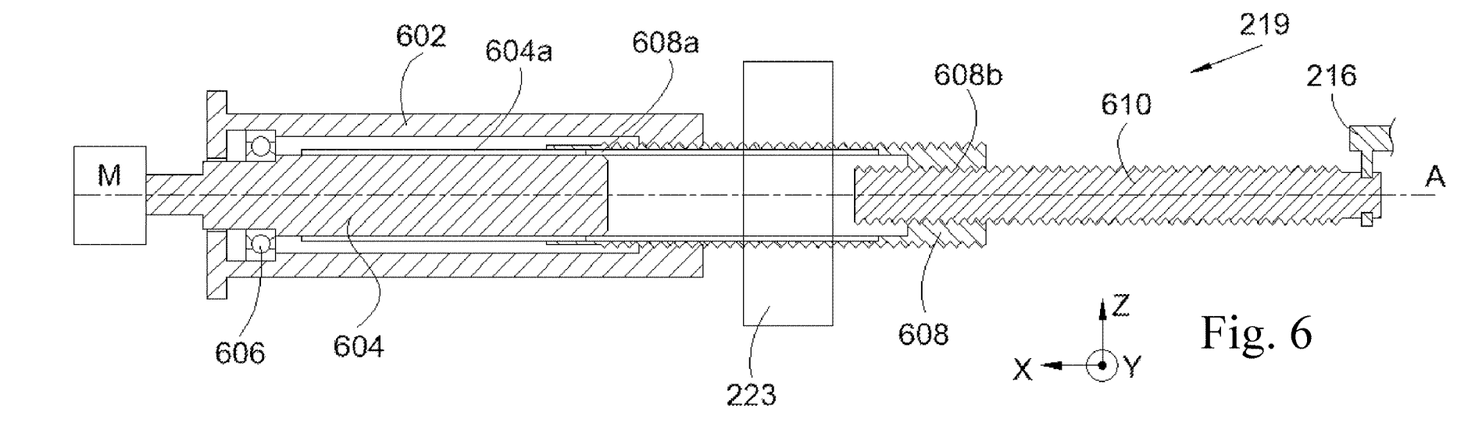
FIG. 6 is a view in section of an actuator in accordance with one particular embodiment of the invention.

An actuator 219 in accordance with one particular embodiment is represented in FIG. 6 and is described below.

The fan cowl 202 and the exterior panels 212 delimit the window 220 on the upstream side relative to the direction of flow and the mobile cowl 216 delimits the window 220 on the downstream side relative to the direction of flow.

To save weight there is used here a transmission system 223 for a pair of arms 250 and therefore a pair of circumferentially adjacent veils 252.

Figure 7:
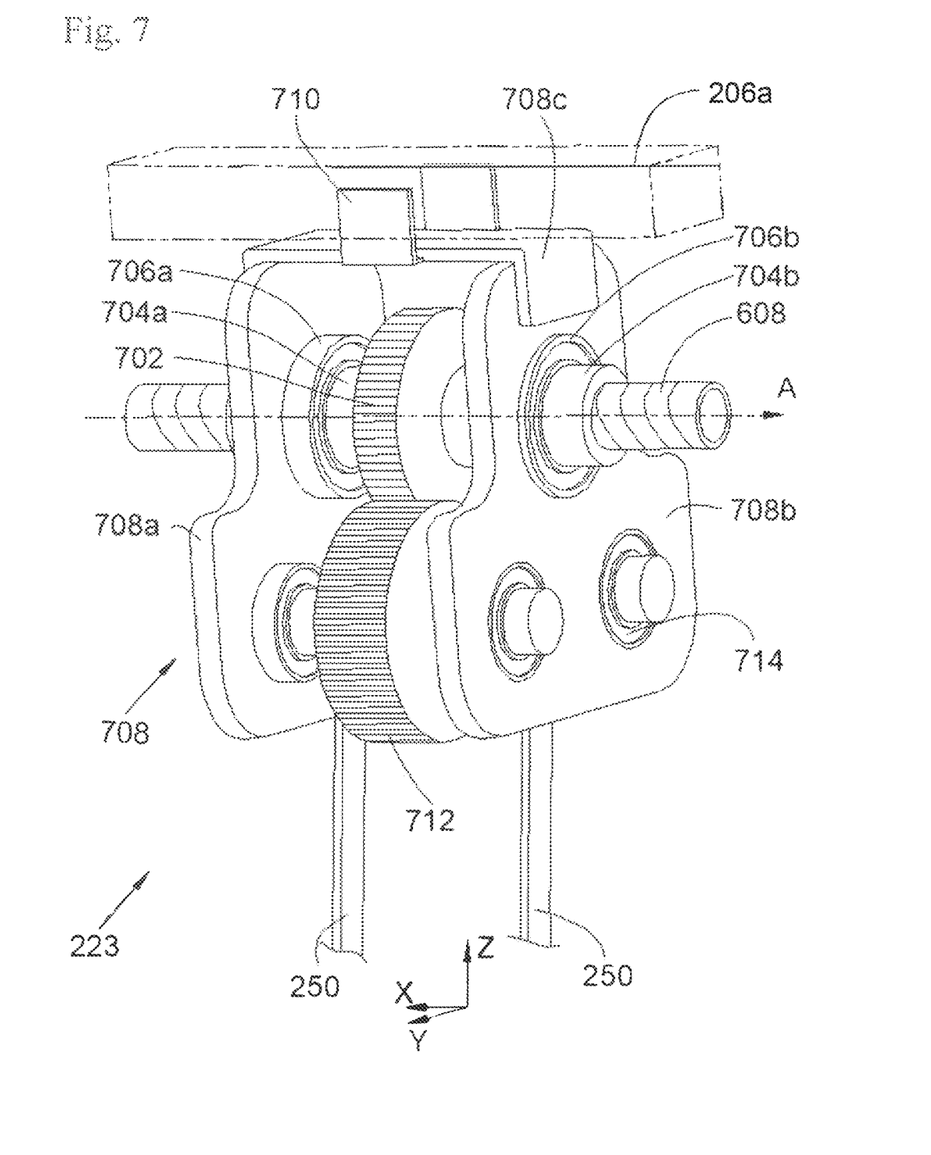
FIG. 7 is a perspective view of a transmission system employed between an actuator and a pair of veils.

In the embodiment of the invention shown in FIG. 2, there is a transmission system 223 for a single veil 252 at its ends, here at 12 o'clock and at 6 o'clock. For two consecutive veils 252 there is a transmission system 223 one embodiment of which is shown in FIG. 7 and described below.

Figure 5:
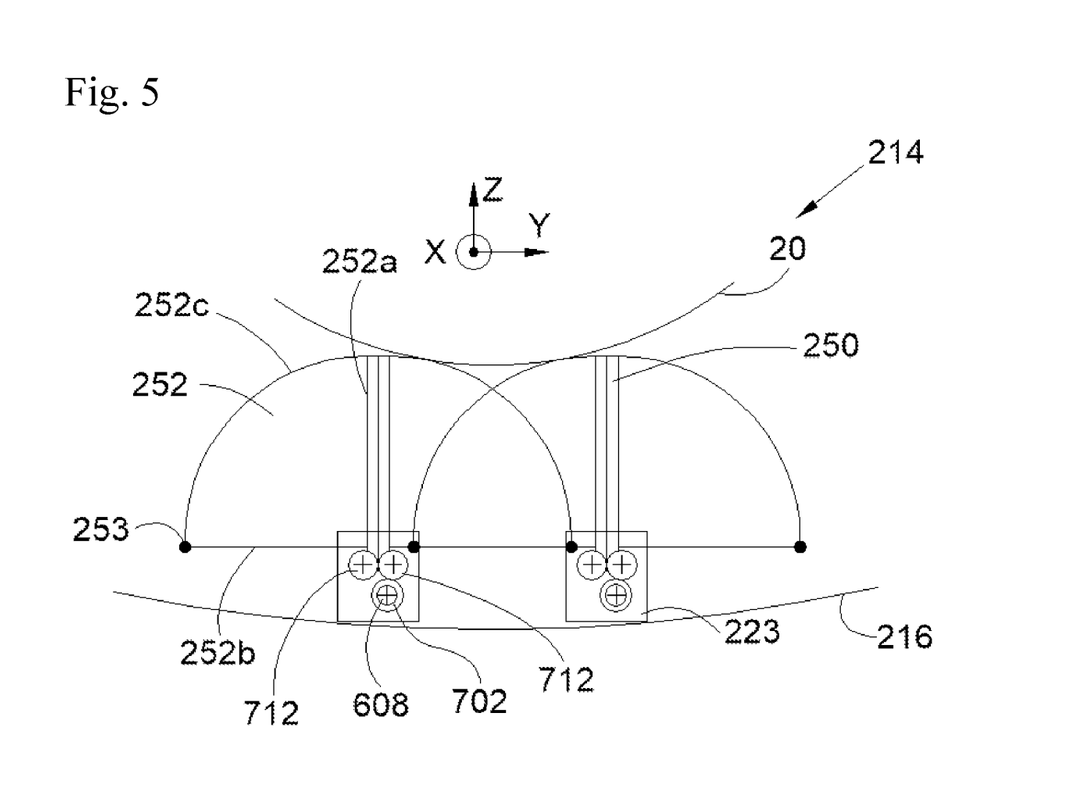
FIG. 5 is a front view of the pair of veils from FIG. 4 in a deployed position.

The veils 252 are superposed in the unfolded position and as FIG. 5 shows they come closest to the engine 20 to block the stream 204.

The advanced position of the transmission system 223 therefore corresponds to the advanced position of the mobile cowl 216 and to the retracted position of the arms 250 and the retracted position of the transmission system 223 corresponds to the retracted position of the mobile cowl 216 and to the deployed position of the arms 250.

In accordance with one particular embodiment, the actuator 219, the mobile cowl 216 and the transmission system 223 are adapted to produce faster movement in translation of the mobile cowl 216 than of the transmission system 223 when they are subjected to the action of the actuator 219.

Starting from the advanced position of the mobile cowl 216, actuation of the actuator 219 simultaneously moves the mobile cowl 216 and the transmission system 223 toward their retracted position, preferably with a faster movement of the mobile cowl 216, and at the same time the arms 250 go from the retracted position to the deployed position, drawing each veil 252 toward its unfolded position. Conversely, starting from the retracted position of the mobile cowl 216, actuation of the actuator 219 in the opposite direction simultaneously moves the mobile cowl 216 and the transmission system 223 toward their advanced position, preferably with faster movement of the mobile cowl 216, and at the same time the arms 250 go from the deployed position to the retracted position, drawing each veil 252 toward its folded position.

Use of the arms 250 rotatably mounted on the mobile cowl 216 and of the flexible veil 252 enables a reduction of overall weight compared to the use of the prior art blocker doors.

The flexible veil 252 must have sufficient structural characteristics to resist the forces generated by the secondary flow 208 and be sufficiently flexible to be able to retract at the edges of the stream 204 into the retracted position. In accordance with one particular embodiment, the flexible veil 252 comprises a flexible mesh structure to which is fixed a flexible skin such as a woven fabric, for example.

FIG. 6 shows an example of an actuator 219 that constitutes a double-acting actuator.

The actuator 219 includes a fixed tube 602 that is fixed to the fixed structure 206 and, in particular, to the cascade support 218. The fixed tube 602 has a longitudinal axis A that is parallel to the direction of movement in translation and to the longitudinal direction X.

The actuator 219 also includes a shaft 604 mobile in rotation inside the fixed tube 602 around the longitudinal axis A. In the embodiment of the invention shown in FIG. 6, the shaft 604 is guided in rotation by a ball bearing 606 mounted between the fixed tube 602 and the shaft 604.

The shaft 604 is driven in rotation about the longitudinal axis A by a motor M, for example of the electric motor type, controlled by the control unit.

The actuator 219 also includes a mobile tube 608 that is mounted inside the fixed tube 602 and a proximal end of which is outside the shaft 604.

The mobile tube 608 has a helical connection about the longitudinal axis A to the fixed tube 602. To this end the fixed tube 602 has an internal thread on an interior surface and the mobile tube 608 has an external thread on an exterior surface that cooperates with the internal thread of the fixed tube 602.

The mobile tube 608 has a sliding connection along the longitudinal axis A to the shaft 604. To this end the shaft 604 has on an exterior surface grooves 604a parallel to the longitudinal axis A and the mobile tube 608 has, for each groove 604a, on an interior surface, starting from its proximal end, a groove 608a that slides along the groove 604a.

Thus, rotation of the motor M in one direction drives the shaft 604 in rotation and because of the helical connection and the sliding connection the mobile tube 608 is moved in rotation and in translation parallel to the longitudinal axis A. The mobile tube 608 moves in translation in one direction or the other depending on the direction of rotation of the motor M.

The transmission system 223, one embodiment of which is represented in FIG. 7, is fastened to the mobile tube 608, therefore causing the movement in translation of the transmission system 223 at a first speed linked to the first screw pitch of the helical connection between the fixed tube 602 and the mobile tube 608.

At its distal end opposite the proximal end the mobile tube 608 has a threaded bore 608b coaxial with the longitudinal axis A.

The actuator 219 also includes a threaded rod 610, a proximal end of which is screwed into the threaded bore 608b. The threaded rod 610 therefore has with the mobile tube 608 a helical connection around the longitudinal axis A.

At its distal end opposite the proximal end, the threaded rod 610 has a pressed-in connection with the mobile cowl 216. In the embodiment of the invention shown in FIG. 6, the pressed-in connection is produced by a circular groove at the level of the distal end of the threaded rod 610 and the mobile cowl 216 has a lug that is accommodated in and clamped in the circular groove.

Because the threaded rod 610 is prevented from rotating by the pressed-in connection, the rotation of the mobile tube 608 therefore drives movement of the threaded rod 610 in translation along the longitudinal axis A and, depending on the rotation direction of the motor M, the threaded rod 610 moves in translation in one direction or the other. The fastening of the mobile cowl 216 to the threaded rod 610 produces the movement in translation of the mobile cowl 216 at a second speed linked to the second screw pitch of the helical connection between the mobile tube 608 and the threaded rod 610.

The senses of the various internal and external threads are the same so that movements thereof are in the same direction for a given direction of rotation of the motor M.

For the mobile cowl 216 to move faster than the transmission system 223, the second speed must be greater than the first speed, which is made possible by a second screw pitch greater than the first screw pitch.

The transmission system 223 includes a main gear 702 that is fixed coaxially to the mobile tube 608 and turns and therefore moves with it.

On respective opposite sides of the main gear 702, the transmission system 223 includes a spacer 704a-b that is internally threaded and screwed onto the external thread of the mobile tube 608 and bears against a face of the main gear 702. Each spacer 704a-b is pressed into a first ball bearing 706a-b.

In accordance with another embodiment, the spacers 704a-b are smooth and mounted to slide on the external thread of the mobile tube 608 and bear against a face of the main gear 702. Each spacer 704a-b is pressed into a first ball bearing 706a-b. During movement of the main gear 702 the latter pushes on the spacer 7040a-b in front of it.

The transmission system 223 also includes a base 708 here comprising two flanges 708a-b disposed on respective opposite sides of the main gear 702 and fastened together by a beam 708c. Each flange 708a-b has a hole through it into which is pressed a first ball bearing 706a-b.

The base 708 includes locking means 710 that immobilize it in rotation relative to the longitudinal axis A. In the embodiment of the invention shown in FIG. 7 the locking means 710 comprise a groove 710 parallel to the longitudinal axis A and the fixed structure 206 includes a rib 206a (shown in chain-dotted line) that is parallel to the longitudinal axis A and is arranged inside the groove 710 to guide movement in translation parallel to the longitudinal axis A and to prevent rotation.

During rotation and movement in translation of the mobile tube 608, the main gear 702 therefore follows the same movement and because of the interaction between the internal thread of each spacer 704a-b and the external thread of the mobile tube 608 rotation of the latter drives movement in rotation and in translation of each spacer 704a-b that drives the base 708 immobilized and guided by the rib 206a.

For each arm 250 that it carries, the transmission system 223 includes a secondary gear 712 mobile in rotation on the base 708, here between the two flanges 708a-b, about an axis parallel to the longitudinal axis A and fastened to the arm 250. Here the shaft of each secondary gear 712 is pressed into a second ball bearing 714 that is itself pressed into a hole in the base 708, here in the corresponding flange 708a-b. Each secondary gear 712 is driven in rotation by the main gear 702 either directly by direct meshing between the secondary gear 712 and the main gear 702 or indirectly by meshing between the secondary gear 712 and the main gear 702 via another secondary gear 712.

So that the two veils 252 are unfolded and folded at the same time, it is necessary to reverse the direction of rotation of the secondary gear 712. In the embodiment of the invention shown in FIG. 7 and FIGS. 4 and 5, the main gear 702 meshes with a first secondary gear 712 and the second secondary gear 712 meshes with the first secondary gear 712.

If there is only one arm 250 there is also only one first secondary gear 712.

The invention has been more specifically described in the case of a nacelle under a wing but may be applied to a nacelle situated at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bypass turbofan having a longitudinal direction and including an engine and a nacelle surrounding the engine that includes a fan cowl in which a stream of a secondary flow is delimited between the nacelle and the engine and in which a flow of air circulates in a flow direction, said nacelle including:
    a fixed structure fixed to the fan cowl and including a cascade support carrying cascades,
    a mobile cowl that is mobile in translation on the fixed structure in a translation direction between an advanced position in which the mobile cowl is positioned so that the mobile cowl is close to the fan cowl and a retracted position in which the mobile cowl is positioned so that the mobile cowl is far from the fan cowl to define between them an open window between the stream and the exterior of the nacelle and facing the cascades,
    a plurality of transmission systems, each of which includes at least one arm with a distal end and a proximal end mobile in translation on the transmission system about a rotation axis globally parallel to the longitudinal direction, in which said arm is mobile between a retracted position in which said arm is outside the stream and a deployed position in which said arm is across the stream, in which each transmission system is mobile in translation between an advanced position corresponding to the advanced position of the mobile cowl and a retracted position corresponding to the retracted position of the mobile cowl,
    for each arm, a flexible veil having a first edge fastened to said arm, a second edge one end of which is fixed to an adjoining transmission system, and a third edge, in which the veil is mobile alternately between a folded position corresponding to the retracted position of the arm in which the third edge is far from the engine and an unfolded position corresponding to the deployed position of the arm, in which the third edge is close to the engine, and
    for each transmission system, an actuator configured to move the mobile cowl and said transmission system simultaneously between their advanced position and their retracted position and vice versa and in which the transmission system is configured to move each arm from its retracted position to its deployed position during movement of the transmission system from its advanced position to its retracted position and vice versa,
    wherein the actuator comprises:
        a fixed tube fixed to the fixed structure and that has a longitudinal axis parallel to the longitudinal direction,
        a shaft mobile in rotation inside the fixed tube about the longitudinal axis and driven in rotation by a motor,
        a mobile tube mounted inside the fixed tube and a proximal end of which is mounted outside the shaft, the mobile tube having a helical connection with the fixed tube with a first screw pitch about the longitudinal axis and the mobile tube having with the shaft a sliding connection along the longitudinal axis, in which the transmission system is fastened to the mobile tube and in which at the level of a distal end the mobile tube has an internally threaded bore coaxial with the longitudinal axis, and
        a threaded rod, a proximal end of which is screwed into the internally threaded bore with a second screw pitch and a distal end of which has a pressed-in connection to the mobile cowl.

2. The bypass turbofan according to claim 1, wherein a transmission system carries a pair of arms.

3. The bypass turbofan according to claim 1, wherein the second screw pitch is greater than the first screw pitch.

4. The bypass turbofan according to claim 1, wherein the transmission system comprises:
    a main gear fixed coaxially onto the mobile tube,
    on respective opposite sides of the main gear, a spacer that is internally threaded and screwed onto the external thread of the mobile tube and bears against a face of the main gear,
    for each spacer, a first ball bearing into which said spacer is pressed,
    a base, including on respective opposite sides of the main gear a flange, in which the two flanges are fastened to one another, in which each flange has a hole through the flange into which a first ball bearing is pressed, in which the base includes immobilizing means for immobilizing the base in rotation relative to the longitudinal axis, and
    for each arm, a secondary gear fastened to said arm and mobile in rotation on the base about an axis parallel to the longitudinal axis and driven by the main gear.

5. The bypass turbofan according to claim 1, wherein the transmission system comprises:
    a main gear fixed coaxially onto the mobile tube,
    on respective opposite sides of the main gear, a smooth spacer mounted to slide on the external thread of the mobile tube and bearing against a face of the main gear,
    for each spacer, a first ball bearing into which said spacer is pressed,
    a base including, on respective opposite sides of the main gear, a flange, in which the two flanges are fastened to one another, in which each flange has a hole through the flange into which a first ball bearing is pressed, in which the base includes immobilizing means that immobilize the base in rotation relative to the longitudinal axis, and
    for each arm, a secondary gear fastened to said arm and mobile in rotation on the base about an axis parallel to the longitudinal axis and driven by the main gear.

6. An aircraft including at least one bypass turbofan according claim 1.

* * * * *